Oct. 24, 1967 J. H. BROWN ET AL 3,349,021

ELECTRODIALYSIS WITH MOVING MEMBRANES

Original Filed Oct. 17, 1962 5 Sheets-Sheet 1

INVENTORS
JERRY HUGH BROWN
DAVID GUY CONNING

BY [signature]

ATTORNEY

ELECTRODIALYSIS WITH MOVING MEMBRANES
Original Filed Oct. 17, 1962 5 Sheets-Sheet 2
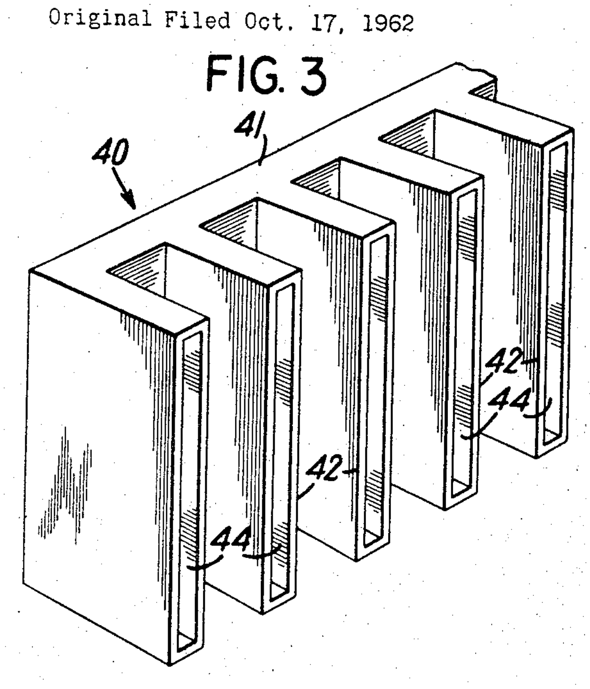
FIG. 4
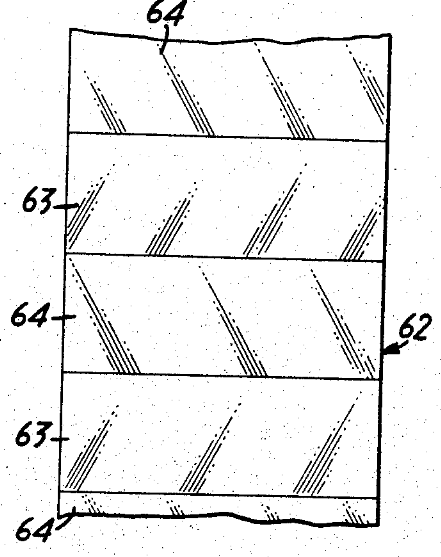
FIG. 5
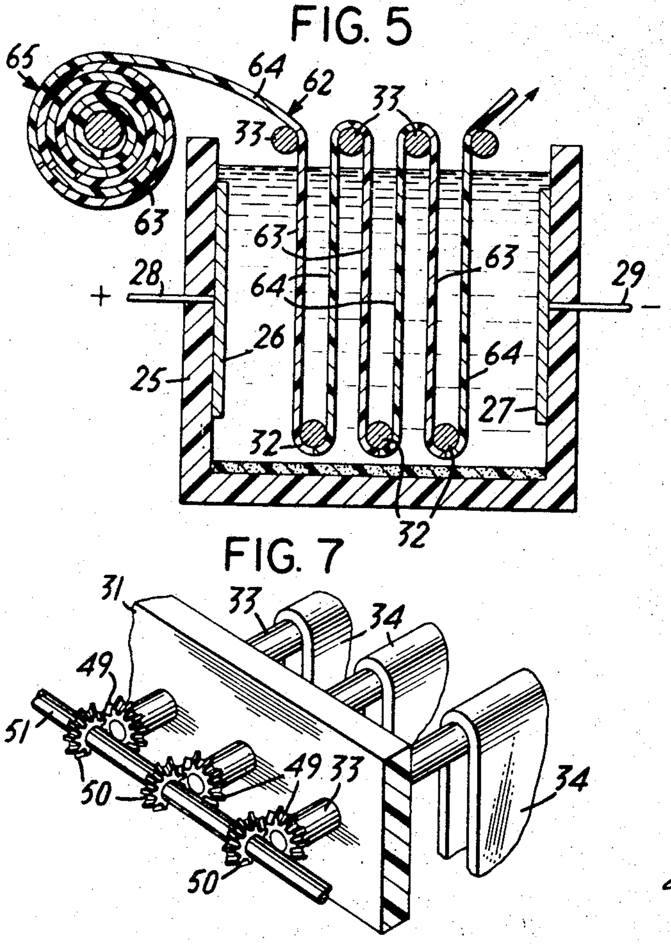
FIG. 6
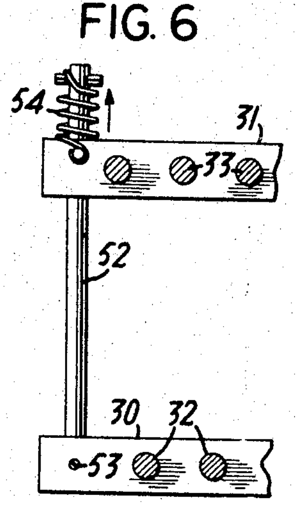
INVENTORS
JERRY HUGH BROWN
DAVID GUY CONNING
BY
Thomas M. Hammond
ATTORNEY

ELECTRODIALYSIS WITH MOVING MEMBRANES

Original Filed Oct. 17, 1962

5 Sheets-Sheet 3

INVENTORS
JERRY HUGH BROWN
DAVID GUY CONNING

BY Thomas M. Hammond

ATTORNEY

Oct. 24, 1967 J. H. BROWN ET AL 3,349,021

ELECTRODIALYSIS WITH MOVING MEMBRANES

Original Filed Oct. 17, 1962 5 Sheets-Sheet 4

*INVENTORS*
JERRY HUGH BROWN
*BY* DAVID GUY CONNING
Thomas M. Hammond
ATTORNEY

INVENTORS
JERRY HUGH BROWN
DAVID GUY CONNING
BY
[signature]
ATTORNEY

United States Patent Office 3,349,021
Patented Oct. 24, 1967

3,349,021
ELECTRODIALYSIS WITH MOVING MEMBRANES

Jerry Hugh Brown, Sunnyvale, Calif., and David Guy Conning, Surrey, England, assignors to American Machine & Foundry Company, a corporation of New Jersey Original application Oct. 17, 1962, Ser. No. 231,614, now Patent No. 3,318,796, dated May 9, 1967. Divided and this application Jan. 10, 1967, Ser. No. 608,426
5 Claims. (Cl. 204—180)

This application is a division of co-pending application Serial Number 231,614 now Patent No. 3,318,796, filed October 17, 1962, and entitled "Electrodialysis."

This invention relates, in general, to fluid treatment devices using membranes which define fluid treatment compartments, and, more particularly, to fluid treatment devices in which a single length of membrane material is folded and positioned to from fluid treatment cells.

An object of this invention is to provide a fluid treatment apparatus containing fluid treatment cells formed by a single length of membrane material which is wound about supporting members in a serpentine path to form fluid treatment cells which may be immersed in a suitable tank.

Another object of this invention is to provide a fluid treatment apparatus in which fluid treatment cells are formed from a single length of a membrane material wound in a serpentine fashion about support members to form the fluid treatment cells, the membrane passing freely about the support members so that the membrane may be positioned by subjecting it to a tension drawing it about the support members.

A further object of this invention is to provide a fluid treatment apparatus in which fluid treatment cells are formed from a single length of membrane disposed in a serpentine path about support members, the membrane being tensioned between the support members by moving one or more support members apart.

Yet another object of this invention is to provide a fluid treatment apparatus within which fluid treatment cells are formed from a single length of membrane material wound in a serpentine path about support members, the strip of membrane material being freely movable about the support members and between the fluid treatment cells.

Still another object of this invention is to provide a fluid treatment apparatus having fluid treatment cells defined by at least one membrane strip wound in a serpentine path, the membrane strip being movable relative to the fluid treatment cells to stir the solution within the cells and assist in the mass transport of fluid within the cells to the faces of the membrane.

An additional object of this invention is to provide a fluid treatment apparatus having at least one sheet of membrane material forming fluid treatment cells within the apparatus, the sheet of membrane material being able to be moved through the apparatus so that the membrane material may be decontaminated, cleaned, chemically treated, exchanged, or otherwise treated while the fluid treatment apparatus is functioning.

A still further object of this invention is to provide a fluid treatment apparatus having fluid treatment cells defined by at least one membrane strip wound in a serpentine path, the membrane strip being movable within the apparatus without the apparatus having to be disassembled to change the membranes within it so that the apparatus is thus out of service for a shorter period of time while its membranes are being changed.

Many other objects, advantages and features of invention reside in the construction, arrangement, and combination of parts involved in the embodiments of the invention and its practice as will be understood from the following description and accompanying drawing wherein:

FIGURE 3 is a perspective view of a fragment of one end of a manifold which may be used in the first embodiment of this invention;

FIGURE 4 is a plan view of a strip of membrane material prepared so that the first embodiment of this invention may function as a conventional electrodialysis stack;

FIGURE 5 is a transverse vertical section through a fluid treatment apparatus according to the first embodiment of this invention with the fluid treatment apparatus functioning as an electrodialysis stack;

FIGURE 6 is an end elevational view of fragments of upper and lower rod support members showing membrane tensioning means;

FIGURE 7 is a perspective view of a support rod drive mechanism;

Figure 1:
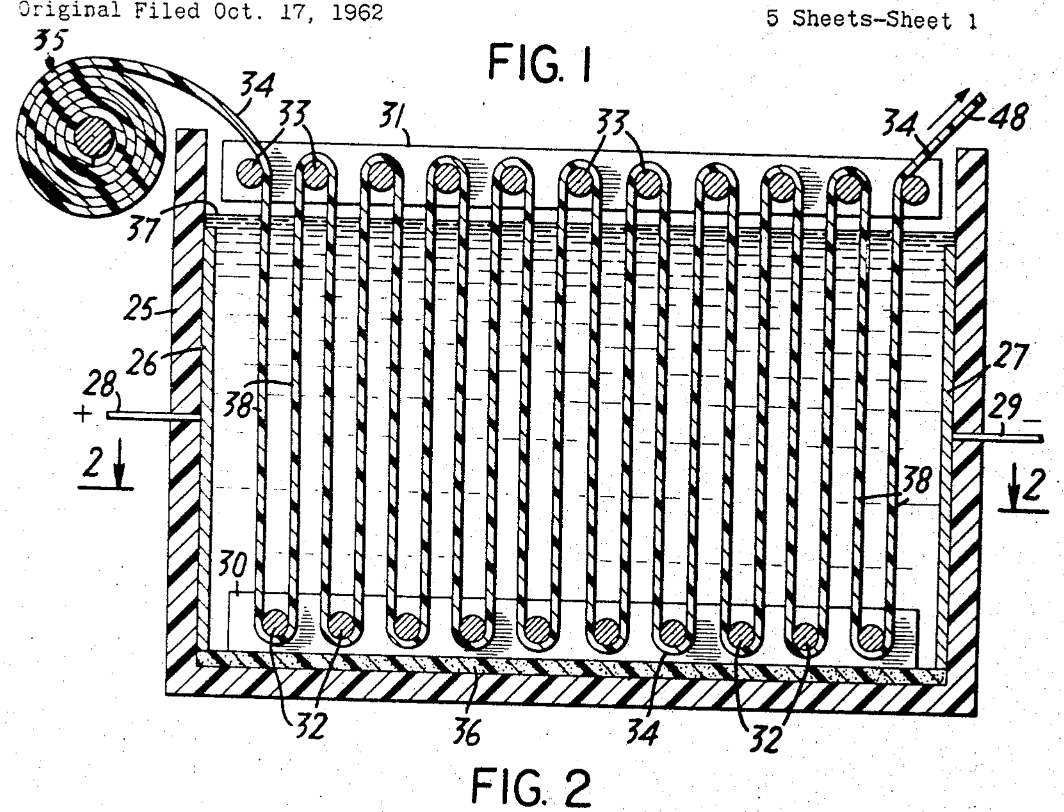
FIGURE 1 is a transverse section through a fluid treatment apparatus according to a first embodiment of this invention.

Referring to the drawing in detail, FIGURES 1, 2, 3 and 6 show a first embodiment of this invention. A suitable tank 25 is open at the top and has two electrodes 26 and 27 positioned vertically along its side walls. Leads 28 and 29 extend from the electrodes 26 and 27 to a suitable current source (not shown). Disposed within tank 25 are two lower rod support members 30 which are near each end of tank 25. Disposed above each lower rod support member 30 is an upper rod support member 31. Between the lower rod support members 30 there extend the lower rods 32 which are spaced apart parallel to each other and between the upper rod support members 31 there extend the upper rods 33.

As is further shown in FIGURE 1, an elongated sheet of membrane material 34 is drawn from roll 35 over the first rod 33, below and about a first rod 32, over a second rod 33, until the sheet 34 describes a serpentine path across the tank 25. If it is desired, a sheet of sponge plastic 36 may extend across the bottom of tank 25 between the lower rod support members 30 to contact the membrane 34 as it passes beneath each rod 32. If the tank 25 is filled with a suitable fluid to a level 37, fluid treatment compartments will be formed between the vertical runs 38 of the sheet 34.

Figure 2:
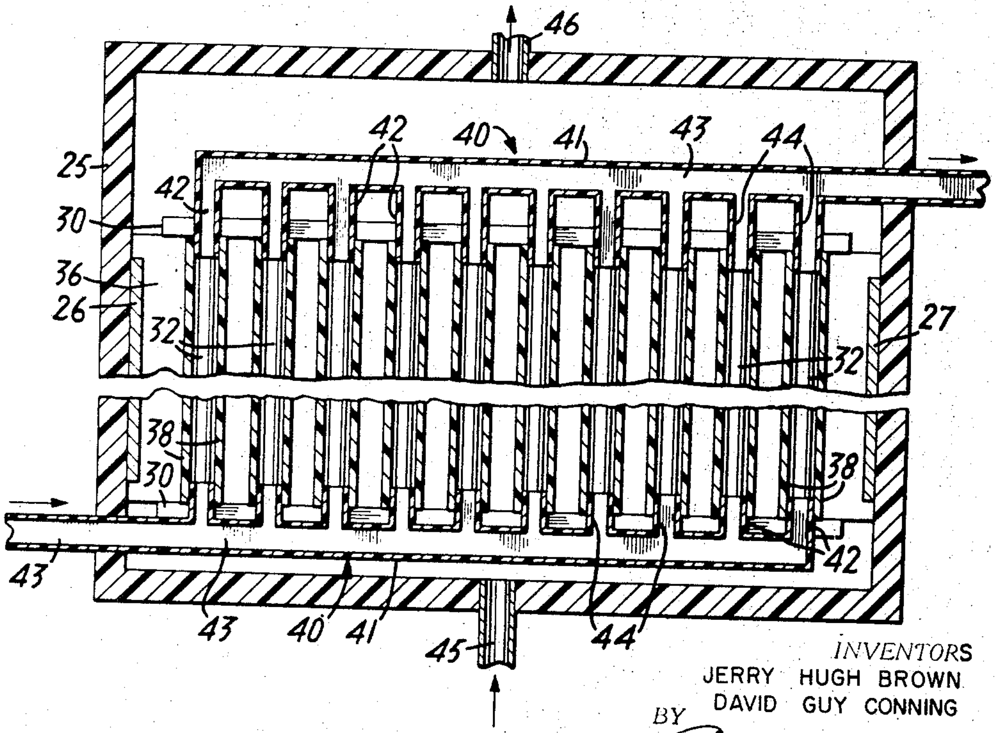
FIGURE 2 is a horizontal section taken on line 2—2 of FIGURE 1 with a central portion of the apparatus broken away.

Referring now to FIGURES 2 and 3, manifolds 40 may have a lateral portion 41 and the longitudinally projecting portions 42. The lateral portions 41 of each manifold 40 may extend laterally to lead through a side of the tank 25. Each lateral portion 41 contains a passageway 43 which communicates with the passageways 44 in each longitudinal projection 42.

Referring further to FIGURE 2, it may be seen that each longitudinal projection 42 extends between adjacent pairs of the vertical runs 38 of the membranes 34 directly above the rods 32. Beyond the manifolds 40, the tank 25 contains an inlet tube 45 at one end and an outlet tube 46 at the other end.

The first embodiment of this invention may be used in the following manner. The tank 25 is filled with a dilute solution of sodium hydroxide to the level 37 as shown in FIGURE 1. The solution of sodium hydroxide enters inlet tube 45 as shown in FIGURE 2 and flows from outlet tube 46. At the same time, a citrus juice or the like, is passed through one manifold 40 to flow between adjacent pairs of the vertical runs 38 of the membrane 34 into the other manifold 40 to be drawn through it out of tank 25. If the membrane 34 is an anion selective membrane, hydroxyl ions will migrate through the membrane into the juice and citrate ions will pass from the juice to the caustic soda stream. The net effect will be to reduce excess acidity in the citrus or other juice to render it more palatable and generally improved as a product for human consumption.

As the membrane 34 becomes contaminated, the end 48 of membrane 34 may be drawn out of tank 25 to pull additional portions of the membrane 34 from the roll 35 into tank 25. This may be done while the apparatus is assembled for use. To facilitate the passage of the membrane 34 through the tank 25, the rods 32 and 33 may be rotatably mounted in the rod support members 30 and 31.

Further, as shown in FIGURE 7, the rods 33 may project through the rod support members 31 to have the bevel gears 49 mounted on them. A number of bevel gears 50 may be mounted on a suitable driven shaft 51 which may be rotated by hand or by any suitable motor means (not shown). Therefore, when the shaft 51 is rotated, the bevel gears 50 drive the bevel gears 49 to rotate all the rods 33 to assist in the drawing of the membrane 34 through the tank 35. If it is desired, the rods 32 may be driven in the same manner.

Even if it is not necessary to draw the membrane 34 through the tank 25 while it is in operation, the particular structure shown in FIGURES 1 and 2 gives rise to another advantage. No membrane supports of any kind are required between the vertical runs 38 of the membrane 34 within the fluid treatment compartments. Supports are not required because adjacent fluid treatment cells are at atmospheric pressure and a tension may be maintained on the membrane 34 to properly position the vertical runs 38 and maintain them in place. If tension is not maintained on the membrane 34 by pulling on its end 48, the ends of the membrane 34 may be fixed or otherwise secured and the rods 32 and 33 moved apart to exert a suitable tension on the membrane 34.

As shown in FIGURE 6, a vertical guide 52 is fixed by means of a set screw 53 to extend upward from within each end of each lower rod support member 30. The upper rod support members 31 have the guide members 52 extend slidably through them so that they may be vertically positioned. A suitable tension spring 54, or any other suitable means, may be used to draw the upper rod support members 31 upwards to maintain a desired tension in the membrane 34.

Figure 15:
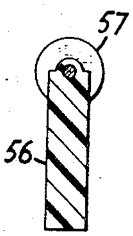
FIGURE 15 is a transverse vertical section through a membrane support element having a roller.

Referring now to FIGURE 15, if the rods 32 and 33 are so long that they flex under the pressure exerted by the membrane 34 passing about them, a deeper flex resistant bar 56 may be substituted for the rod 32 or 33. Rollers 57 are rotatably mounted at short intervals along either the top or bottom edges of the bars 56 so that the membrane 34 will easily pass above or below them.

Figure 19:
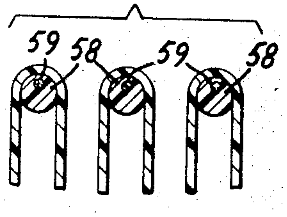
FIGURE 19 is a transverse vertical section showing an alternate membrane tensioning apparatus in a slack position.
Figure 20:
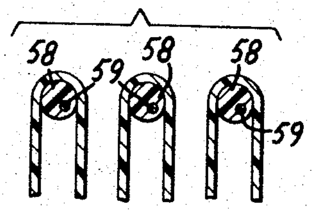
FIGURE 20 is a transverse vertical section showing the alternate membrane tensioning apparatus in a tightening position.

Referring now to FIGURES 19 and 20, suitable rods 58 may be eccentrically mounted about shafts 59. Therefore, when the shafts and the eccentric rods 58 are rotated, the eccentrically mounted rods 58 will tighten the membrane 34.

Figure 16:
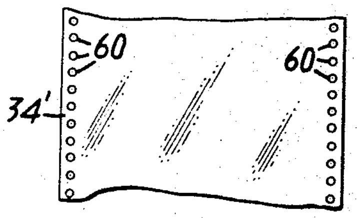
FIGURE 16 is a plan view of a fragment of a sheet of membrane containing drive perforations.
Figure 17:
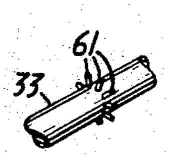
FIGURE 17 is a perspective view of a shaft carrying a drive sprocket.
Figure 18:
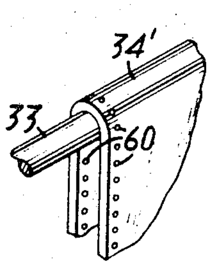
FIGURE 18 is a perspective view of a section of a drive shaft and drive sprocket driving a fragment of a membrane.

Referring now to FIGURES 16, 17 and 18, a membrane 34' may have a series of driving perforations 60 formed along its edges. Driven rods 33 then may have the driving sprockets 61 mounted on them near each end. The sprockets 61 will then engage the apertures 60 to pass the membrane 34' in a positive fashion through the tank 25.

As shown in FIGURE 4, a membrane 62 may be formed with alternate strips 63 and 64 of anion and cation permeable membrane. The membrane 62 may be fabricated by welding or gluing strips 63 and 64 together or by chemically preparing the strips 63 and 64 in the sheet 62.

FIGURE 5 shows a membrane 62 drawn from a roll 65 about the rods 33 and 32 in the same manner which has been described. The widths of the panels 63 and 64 are such that each panel 63 or 64 forms a vertical run between a pair of rods 32 and 33. Therefore, when the membrane 62 is drawn into the position shown in FIGURE 5, each fluid treatment cell is bounded by an anion and a cation permeable membrane. Then, with the use of suitable manifolds such as those shown in FIGURES 2 and 3, the apparatus of this invention may function as a conventional electrodialysis stack with alternating concentrating and diluting compartments in adjacent fluid treatment cells.

Figure 8:
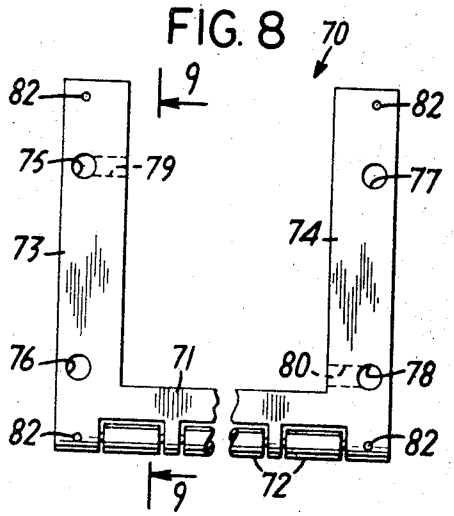
FIGURE 8 is a side view of a first gasket used in the second embodiment of this invention.
Figure 9:
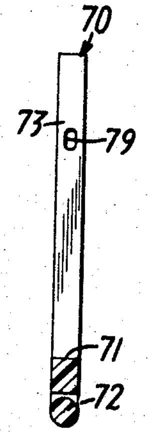
FIGURE 9 is a vertical section taken on line 9—9 of FIGURE 8.

Referring now to FIGURES 8 and 9, frames 70 may be formed with each having a transverse portion 71 carrying the rotatably mounted rollers 72 at its lower edge. Vertical arms 73 and 74 extend upward from the ends of each portion 71. Each arm 73 contains the transverse manifold apertures 75 and 76 and each arm 74 contains the manifold apertures 77 and 78. Extending from the manifold apertures 75 and 78 into the central openings in the gaskets 70 are the internal fluid flow passages 79 and 80.

Figure 10:
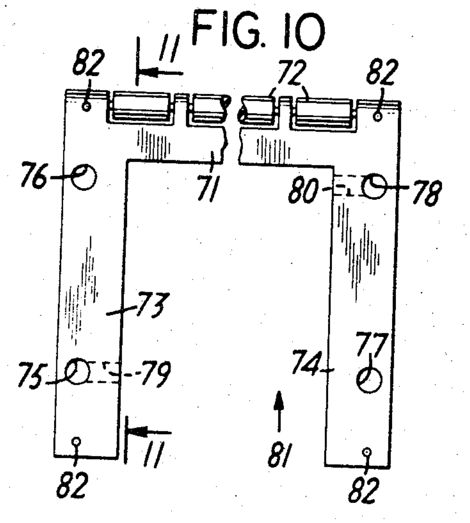
FIGURE 10 is a side view of the second gasket used in the second embodiment of this invention.
Figure 11:
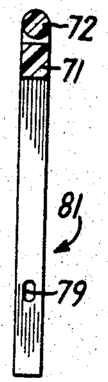
FIGURE 11 is a vertical section taken on line 11—11 of FIGURE 10.
Figure 12:
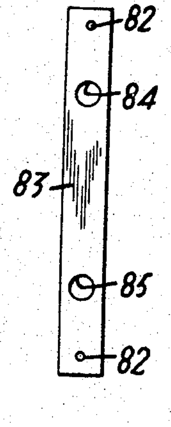
FIGURE 12 is a side view of a spacer member which is inserted between both sides of the gasket shown in FIGURES 8 and 10.

The gaskets 81, as shown in FIGURES 10 and 11, are identical to the gaskets 70 in a reversed and inverted position. The arms 73 and 74 contain the alignment apertures 82 in both the gaskets 70 and 81. As shown in FIGURE 12, thin spaced strips 83 contain alignment apertures 82 and manifold apertures 84 and 85.

Figure 13:
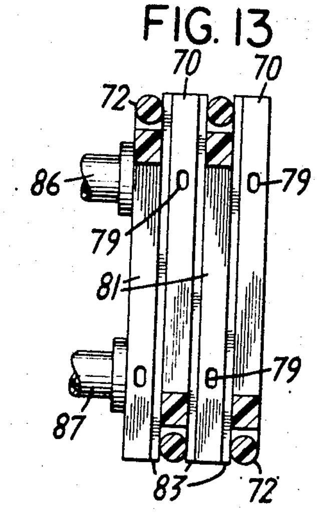
FIGURE 13 is a transverse vertical section through four gaskets assembled according to the second embodiment of this invention with fragments of manifold tubes shown fixed in position.
Figure 14:
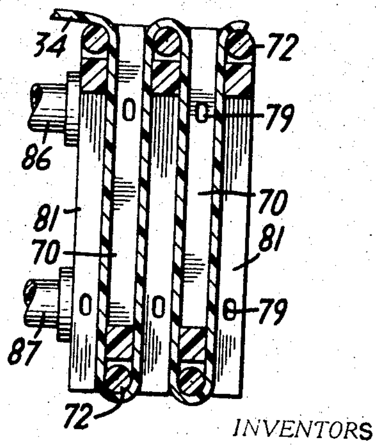
FIGURE 14 is a transverse vertical section through five assembled gaskets according to the second embodiment of this invention with a sheet of membrane material shown in position.

Referring now to FIGURE 13, gaskets 70 and 81 are stacked one by the other with spacer strips 83 interspersed between the arms 73 and 74. The gaskets 70 and 81 are clamped together by any suitable means, such as through bolts (not shown). As shown in FIGURE 14, a strip of membrane 34 may be drawn in a serpentine path about the rollers 72. When the frames 70 and 81 are then immersed in a suitable tank, manifold tubes may be connected to the aligned manifold apertures 75, 76, 77 and 78. In this manner, by means of four manifold tubes 86 and 87, fluid flow may be directed into each frame 70 through an aperture 79 and out of an aperture 80. In a like manner, fluid flow may be directed through each frame 81 into an aperture 79 and out of an aperture 80. The spacer strips 83 may be of a slightly greater thickness than the membrane 34 so that adjacent frames 70 and 81 will not pinch the membrane 34 which can then be drawn freely through the stack. Since the spacer strips 83 are not as wide as the vertical arms 73 and 74, the edges of the membrane sheet 34 extend over the inner portion of the sides of the vertical arms 73 and 74. This particular construction minimizes cross-leakage between adjacent cells while allowing a fluid treatment apparatus to be made having a movable membrane. Spacer strip 83 may be made the same thickness as the membrane to substantially prevent any cross-leakage. Clamping pressure may then be relaxed on the stack when the membrane is to be drawn through it.

Figure 21:
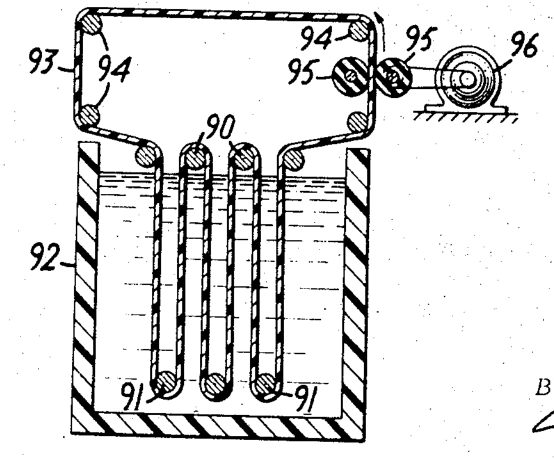
FIGURE 21 is a transverse vertical section through a third embodiment of this invention showing a constantly driven endless sheet of membrane being pulled through a fluid treatment apparatus.

Referring now to FIGURE 21, a number of rods 90 and 91 are disposed within a tank 92. Suitable manifolds 40, such as those shown in FIGURE 3, may be used to direct fluid through the fluid treatment compartments formed by the membrane 93 which is passed about the rods 90 and 91 in a serpentine path. The membrane 93 has its ends jointed together to form an endless belt and passes about the additional guide rods 94 disposed above tank 92. A pair of rubber drive rollers 95 may be driven by an electric motor 96 or any other suitable means. If the membrane 93 is constantly driven by the rollers 95 through the fluid treatment apparatus while it is in operation, the motion of the membrane 93 will assist in the mass transport of fluid across the working faces of the membrane 93 and oppose polarization. This membrane movement is the equivalent of stirring the solution within the narrow fluid treatment cells. The movement of membrane 93 may be at a high speed in one direction, it may be a rapid backward and forward motion, or it may simply be an intermittent motion in one direction. Naturally, it is easiest to draw the membrane 93 in one direction as shown in FIGURE 21. Further, the membrane 93 may be treated, rejuvenated, or cleaned while it is passing beyond the tank 92.

Figures 22, 23, 24, 25, 26:
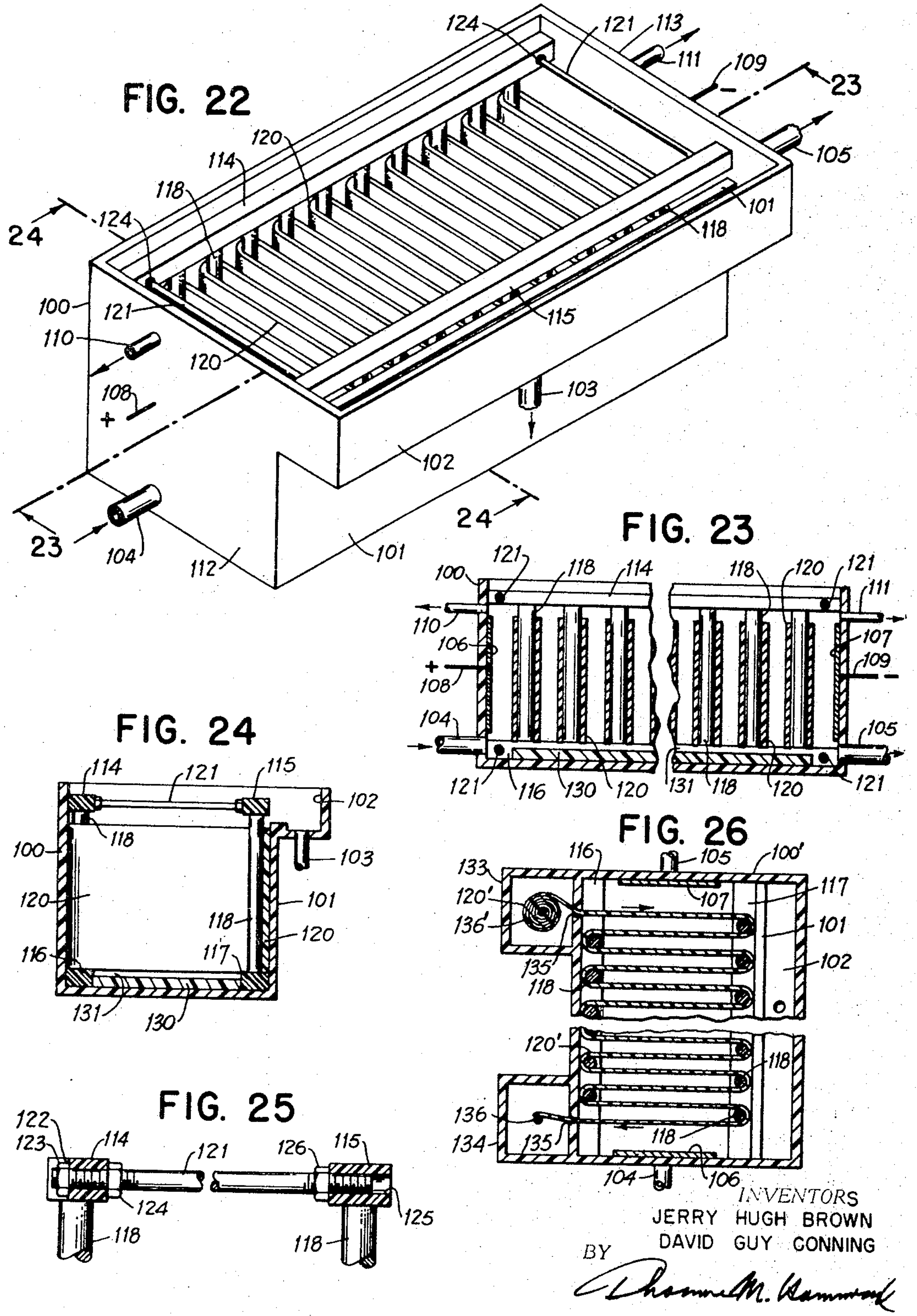
FIGURE 22 is a perspective view of a tank containing fluid treatment apparatus according to a third embodiment of this invention.
FIGURE 23 is a longitudinal vertical section with a central portion broken away taken on line 23—23 of FIGURE 22.
FIGURE 24 is a transverse vertical section taken on line 24—24 of FIGURE 22.
FIGURE 25 is a vertical section through two rod support members showing a lateral positioning means.
FIGURE 26 is a horizontal section taken from above with a central portion broken away showing a modification of the third embodiment of this invention.

As shown in FIGURES 22, 23 and 24, a third embodiment of this invention has a generally rectangular tank 100 with a lower side wall 101 beyond which there is disposed the integrally formed overflow drain trough 102. Trough 102 is drained by the product stream tube 103. Fluid to be treated enters the bottom portion of tank 100 through tube 104 and a concentrate stream or waste stream emerges from the bottom of tank 100 through tube 105.

Disposed within each end of tank 100 are the electrodes 106 and 107 connected to suitable leads 108 and 109 which extend out of tank 100 and are connected to a current source (not shown). Electrode washing stream discharge tubes 110 and 111 extend through the end walls 112 and 113 of tank 100.

Referring now to FIGURE 24, four rod support members 114, 115, 116 and 117 extend longitudinally within tank 100 between the end walls 112 and 113. Membrane support rods 118 extend vertically a spaced distance apart in two rows between the membrane support rods 114 and 116 and 115 and 117 close to the sides of tank 100. As shown in FIGURES 22 and 24, a single membrane strip 120 is wound in a serpentine path back and forth across the inside of tank 100 about the rods 118.

As shown in FIGURE 25, the rod support members 114 and 115 and the rod support members 116 and 117 may be spaced laterally by means of threaded rods 121. If two notches 122 are formed in a rod support member 114 where the threaded rods 121 enter them, two nuts 123 and 124 may be screwed together along each rod 121 to clamp the rods 121 to the rod support member 114. The other end of each rod 121 extends slidably within a channel 125 formed in the rod support member 115. Therefore, as the nuts 126 are screwed outward along rod 121, the nuts 126 will urge the rod support member 115 away from rod support member 114. Therefore, by means of four rods 121, the rod support members 114, 115, 116 and 117 may be positioned apart from each other to tension the serpentine membrane 118.

The third embodiment of this invention operates in the following manner. If a fluid to be treated, such as an aqueous solution of a salt, is introduced through tube 104 and the membrane sheet 120 is a cation premeable membrane, it will form a number of adjacent fluid treatment cells between the electrodes 106 and 107. Within each fluid treatment cell, the fluid next to the membrane defining the side of the cell disposed toward the cathode will become slightly dilute and contain less ions than the anode side of the same cell. This difference in concentration across the single fluid treatment cell defined by a cation permeable membrane arises because cations are drawn towards the cathode and tend to leave each fluid treatment cell through the cation permeable membrane. However, on the side of each cell disposed towards the anode, anions cannot pass through the ion selective cation permeable membrane and thus are concentrated in each cell on the anode side. It addition to the anion concentration on the anode side of each cell, there are also cations which have passed through the adjacent cation permeable membrane towards the cathode. Since fluid containing a higher concentration of ions in solution is more dense than the fluid containing a lesser concentration of ions, the more dense fluid on the anode side of each fluid treatment cell slowly sinks towards the bottom of the cell as the less concentrated fluid on the cathode side of each cell slowly rises.

As shown in FIGURES 22 through 24, the level of fluid within tank 100 overflowing the lower wall 101 will be a slight distance above the upper edge of the serpentine membrane strip 120. Thus fluid flows into this third embodiment of the invention through tube 104 to fill the fluid treatment compartments defined by membrane 120. Relatively dilute fluid within the fluid treatment compartments rises above the fluid treatment compartments to overflow into trough 102 and be withdrawn through tube 103 as a product stream. Relatively concentrated fluid falls within each fluid treatment compartment to sink below the lower edge of the membrane 120 and pass from the tank through the tube 105. Since, as shown in FIGURES 23 and 24, the bottom edge of the membrane 120 is disposed a considerable distance above the bottom of tank 100, a plastic block 130 is placed between the rod support members 116 and 117 to leave a slight clearance 131 beneath the membrane 120. This slight clearance 131 tends to control the rate of flow beneath the membrane 120. Fluid also passes upward in front of the electrodes 106 and 107 to wash them and emerge from tank 100 as electrode washing streams through the tubes 110 and 111.

While FIGURE 24 shows the membrane 120 being held against the sides of tank 100 by the rods 118, suitable blocks of foam rubber or the like may be interspersed between the sides of tank 100 and the membrane 120 to prevent leakage of fluid past the fluid treatment cells. In addition, the bars 56, such as those shown in FIGURE 15, may be substituted for the rods 118.

Referring now to FIGURE 26, a tank 100' may be slightly modified as will be described. A tank 100' is in many respects similar to tank 100. Fluid to be treated enters tank 100' through a tube 104 and a concentrate stream leaves the bottom of tank 100' through a tube 105. A dilute stream overflows wall 101 into trough 102 to be drawn off. Rod support members support the two rows of rods 118 so that a strip of membrane material 120' may extend in a serpentine path about them. Tank 100' differs from tank 100 in that it has two additional compartments 133 and 134 disposed at each end of tank 100' opposite trough 102. The compartments 133 and 134 are fluid tight and integrally formed with tank 100'. A single vertical slot 135 enables a roll 136' of membrane material 120' within compartment 133 to be drawn into the central portion of tank 100'. The membrane 120' is then wound in a serpentine path about the rods 118 to define fluid treatment cells. The strip of membrane material 120' then extends through the slot 135 in compartment 134 and is attached to a shaft 136. Therefore, by winding shaft 136 in a counter-clockwise direction as shown, the membrane 120' may be drawn through tank 100'. Thus membranes within tank 100' which define fluid treatment cells may be changed either while the apparatus is operating or when the fluid treatment apparatus is shut off. This feature of the invention allows the membrane 120' to be more rapidly and easily changed should it be contaminated during the operation of the apparatus.

Should it be desired, a membrane 120' similar to that shown in FIGURE 4 may be used in this third embodiment of the invention so that alternate fluid treatment cells are either diluting or concentrating cells.

While this invention has been disclosed in the best forms known, it will nevertheless be understood that these are purely exemplary and that modifications in the construction, arrangement and combination of parts, the substitution of materials and the substitution of equivalents mechanically and otherwise, may be made without departing from the spirit of the invention.

What is claimed is:

1. A method of electrodialysis comprising moving an ion exchange membrane through an electrodialysis device under tension while passing a current across said membrane and through fluid being treated and thereby agitating said fluid under treatment.

2. A method of electrodialysis according to claim 1 wherein the membrane is driven through said liquid continuously in one direction.

3. A method of electrodialysis according to claim 1 wherein the membrane is driven through said liquid intermittently in one direction.

4. A method of electrodialysis according to claim 1 wherein the membrane is driven through said liquid alternately in forward and backward directions.

5. A method of electrodialysis in which an ion bearing liquid in the electrodialysis device is electrodialysed wherein an ion selectively permeable membrane is moved under tension through the liquid along a sinuous path while passing a current across said membrane and through said liquid, the movement agitating said liquid under treatment.

References Cited

UNITED STATES PATENTS 1,590,593 6/1926 Taylor et al. -------- 204—300

FOREIGN PATENTS 532,148 1/1941 Great Britain.

JOHN H. MACK, *Primary Examiner.*

A. PRESCOTT, *Assistant Examiner.*